Figure 1:
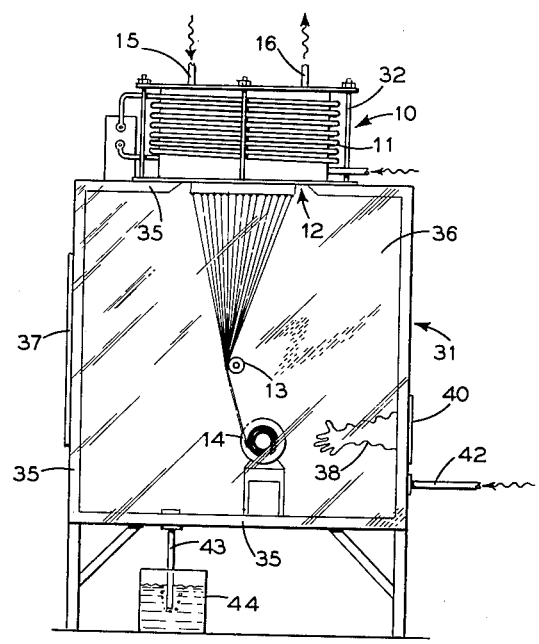

Dec. 4, 1962   F. J. HARTWIG ETAL   3,066,504
APPARATUS FOR FORMING A CERAMIC FILAMENT
Filed March 22, 1960

*INVENTORS*
Frederick J. Hartwig
Frederick H. Norton

ATTORNEY

United States Patent Office 3,066,504
Patented Dec. 4, 1962

3,066,504
APPARATUS FOR FORMING A CERAMIC
FILAMENT
Frederick J. Hartwig, Alliance, Ohio, and Frederick H. Norton, Boston, Mass., assignors to The Babcock & Wilcox Company, New York, N.Y., a corporation of New Jersey
Filed Mar. 22, 1960, Ser. No. 16,843
2 Claims. (Cl. 65—1)

The present invention relates to apparatus for producing filaments of ceramic materials. More particularly, the invention relates to the apparatus for producing ceramic filaments of, for example, from 10 to 50 microns in diameters, from a material having a melting point of at least 3000° F.

The filaments of the present invention have high tensile strength and are not subject to fracture under bending stresses, even under high temperature conditions. Such filaments of ceramic materials are desirable for use as a reinforcing material in plastics and metals where the composite material is exposed to high temperature service.

In forming the filaments a mass of ceramic material having a silica base with the addition of a minor percentage of a metallic oxide is subjected to a controlled temperature so as to maintain the mass in a molten condition. The temperature of the mass should be such that the molten material will have a preferred viscosity in the range of from 100 to 500 poises. The container in which the ceramic material is maintained in its molten state is provided with a discharge nozzle of selected size and positioned so that gravitational flow of the molten material is initiated. The drop or droplet of ceramic material moving downwardly through the nozzle engages a winding reel so that the filament may be withdrawn at a selected speed from the nozzle to form the finished filament of the desired size. The speed of withdrawal in combination with the viscosity of the material determines the diameter of the filament so formed.

In the present invention, the nozzle is fabricated of tungsten so as to be able to withstand temperatures of from 3000° F. to 4000° F. At such temperatures and in the service described, it is desirable to protect the tungsten nozzle against oxidation, thus both the furnace and the lower end of the nozzle are maintained in a protective atmosphere. A desirable material for the atmosphere is helium or, under certain conditions, a mixture of hydrogen and nitrogen. According to this invention, the furnace, the nozzle and the winding reel are all enclosed, with the enclosure filled with the protective gas.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 2:
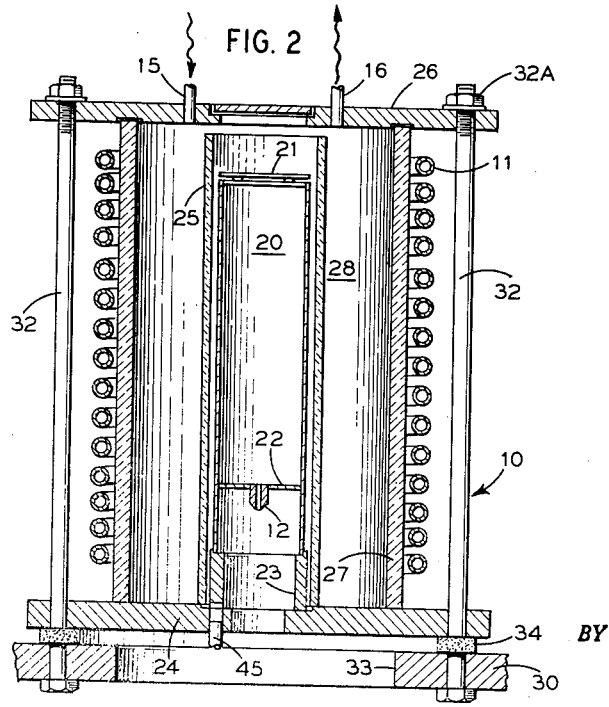
Figure 3:
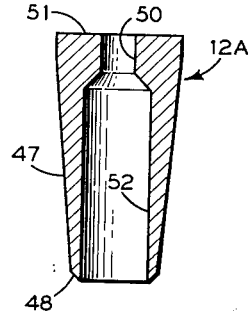

Of the drawings:
FIG. 1 is a side elevation of the furnace and winding mechanism for the formation of ceramic filaments according to the present invention;
FIG. 2 is an enlarged end view, in section, of the furnace disclosed in FIG. 1; and
FIG. 3 is a further enlarged section of a nozzle suitable for use in the apparatus shown in FIGS. 1 and 2.

While the present invention is illustrated as being applicable to the formation of a ceramic filament, the invention has other uses with other materials where the temperatures of the material being drawn may be considerably less than that contemplated in the present invention.

As shown in FIG. 1, the furnace 10 is of the electrical induction type where the induction coil of a hollow conductor 11 encloses the exterior surface of the furnace. The lower portion or bottom of the furnace is provided with a single row of nozzles 12 for the withdrawal of a filament from each nozzle. It will be understood that multiple rows of nozzles may be used, if desired. The filaments are gathered on a transversely elongated guiding roll 13 and collected in separate strands on motor driven reel 14. The reel is operated at a variable speed coordinated with the viscosity of the ceramic material discharging from the furnace.

As schematically shown in FIG. 1, the furnace 10 is provided with an inlet and outlet connection 15 and 16, respectively, for the movement of protective gas, such as helium, through the furnace. Since control of the temperature of the molten mass maintained in the furnace is important to the formation of a proper filament, the input of electrical energy to the furnace coils must be closely regulated. Such electrical control mechanisms are well known, but the regulation of the electrical input must be coordinated with the actual temperature of the mass of molten ceramic material in the retort of the furnace. Due to the high temperature involved in the process, an optical pyrometer (not shown) is ordinarily used for temperature determinations.

The detail construction of a suitable furnace for the purpose described is shown in FIG. 2. The furnace includes an inner retort 20 which is fabricated from tungsten. The top of the retort is provided with a removable lid 21 for the addition of the raw materials selected for melting and is further provided with a bottom plate 22 in which the nozzle or nozzles 12 are positioned. The detail construction of a nozzle 12A is hereinafter described in connection with FIG. 3. As shown in FIG. 2, the bottom plate 22 of the retort is spaced above the lower end of the retort which in turn is mounted on a zirconia tube 23 resting on the bed plate 24. The retort 20 and sleeve 23 are enclosed by a zirconia tube 25 radially spaced therefrom, with the tube 25 resting upon the plate 24 and having its upper end spaced below the lower surface of a cover plate 26 in which the helium inlet and outlet 15 and 16 are positioned. Exteriorly of the zirconia tube 25 and radially spaced therefrom is an outer tube 27 of quartz which is closed at its upper end by the cover plate 26 and rests at its lower end on base plate 24. The space 28 between the zirconia tube and the quartz tube is advantageously filled with an insulating material capable of withstanding the temperatures involved in the furnace operations. A suitable insulator for this purpose is exploded zirconia particles which are not only of a heat insulating character, but are also stable under high tempreature conditions. The water cooled induction coil 11 surrounds the exterior surface of the quartz tube 27 so that the currents induced by the coil are concentrated in the materials maintained within the tungsten retort 20.

As shown in FIGS. 1 and 2, the base plate 24 of the furnace is attached to and supported by a member 30 which forms the top plate of a lower enclosure 31. The assembly of furnace parts is maintained in positional relationship relative to the lower enclosure 31 and in its assembled relation by means of through bolts 32 which extend through the top cover plate 26 and the member 24. Advantageously, the through bolts are threaded at their upper ends to be engaged by a nut 32A or the like. With the construction described, the furnace 10 is rigidly maintained in its position relative to the lower enclosure 31 and may be readily disassembled for replacement or maintenance of parts.

The member 30 is provided with a central opening 33 therethrough having dimensions less than that of the plate 24, so that a gasket 34 may be inserted between member 30 and plate 24 to seal the joint therebetween. The member is supported on and by a frame (indicated in FIG. 1 by the angle irons 35) which is enclosed on all sides and the bottom by panels 36, preferably formed of transparent plastic, joined to form an air tight enclosure. Suitable access doors, such as 37, are provided in the panels, with the doors capable of sealing the openings in the panels when the doors are closed. When desired, a flexible rubber glove 38 may be affixed to extend through a panel opening, as at 40, for manipulation of the winding mechanism 14.

An inert gas, such as helium, is maintained in the enclosure, to protect the tungsten nozzle 12 from oxidation and to protect the filament formed in the apparatus. As shown in FIG. 1, helium is introduced through an inlet pipe 42, and is discharged through a discharge pipe 43. The end of the pipe 43 is submerged in water or other liquid in a container 44 so that the pressure of helium in the enclosure may be maintained at a selected value above atmospheric pressure. In the embodiment shown, a pressure equalizing pipe 45 connects the enclosure 31 with the interior of the furnace 10. With such an arrangement the pressure exerted upon the nozzle 12 will be substantially equal above and below the nozzle, and any change in pressure on the nozzle will be due to the change in head of molten ceramic maintained in the tube 20.

While the nozzle 12 may be constructed with a uniform diameter bore, as shown in FIG. 2, a preferred form of nozzle 12A is shown in FIG. 3. In the nozzle, the outer surface 47 converges toward the lower end 48, with a small diameter bore 50 extending downwardly from the upper end 51 of the nozzle to open into a larger diameter bore 52.

As an example of the operation of the apparatus described, a continuous filament or thread was formed from a molten mass of ceramic having a composition of 90% $SiO_2$ and 10% $Al_2O_3$. The mass was maintained at a temperature of approximately 3450° F. (optical reading) and the viscosity was approximately 400 poises. With an average head of 1″ of molten ceramic imposed on the nozzle, the winding speed of the reel 14 was varied between 2000 and 8000 feet per minute with the corresponding filament diameter varying between 37 and 12 microns. Under the above conditions, the bore 50 of nozzle 12A had a diameter of .140 inch and a length of .1875 inch, while the bore 52 had a diameter of .280 inch and the overall nozzle length was 1 inch.

Any change in the viscosity of the molten mass within the furnace 10, by reasons of a temperature change would change the diameter of the filament, when withdrawn at a constant speed of the reel 14. For example, a 50° F. increase in the temperature of the ceramic mass may increase the filament diameter 10–15 percent, and thereby necessitate an increase in the speed of rotation of the reel 14.

Ceramic compositions other than the 90% $SiO_2$—10% $Al_2O_3$ have been successfully drawn with comparable results, but with different physical characteristics. Good results have been attained with $SiO_2$ mixtures where CaO, MgO and $TiO_2$ have been substituted for the $Al_2O_3$. All of these compositions have been characterized by high tensile strength at temperatures in the range of 1500–2000° F. For example, the silica-alumina composition retained approximately ¾ of its room temperature tensile strength when tested at 1000° F.

While in accordance with the provisions of the statutes we have illustrated and described herein the best form and mode of operation of the invention now known to me, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. In apparatus for forming a filament of ceramic material, the combination comprising a furnace, means for maintaining a molten charge of ceramic material in said furnace, walls spaced from and defining a casing around said furnace, means for maintaining an inert atmosphere in said casing around said furnace, a tungsten nozzle positioned in the bottom of said furnace for the withdrawal of a filament of said ceramic material therefrom, means for drawing said filament from the nozzle at a controlled rate, means enclosing the lower end portion of said nozzle and said filament drawing means, means for manipulating the filament and said filament drawing means within said enclosing means, means for maintaining an inert gas in said enclosing means, and restricted pressure equalizing means interconnecting said furnace casing and said enclosing means.

2. In apparatus for forming a filament of ceramic material, the combination comprising a furnace, means for maintaining a molten charge of ceramic material in said furnace, means for protecting said furnace and molten ceramic material including a blanket of inert gas, a nozzle positioned in the bottom of said furnace for the withdrawal of a filament of said ceramic material therefrom, means for drawing said filament from the nozzle at a controlled rate including a winding means, means enclosing said nozzle and winding means, and means for maintaining a substantially inert oxygen-free gas in said enclosure including a source of inert gas at a superatmospheric pressure, a valved inlet pipe connecting said source of gas with said enclosing means and an outlet pipe from said enclosing means submerged in a sealing liquid to regulate the pressure of the gas in said enclosing means.

References Cited in the file of this patent

UNITED STATES PATENTS

| | | |
|---|---|---|
| 1,592,140 | Horton et al. | July 13, 1926 |
| 2,276,295 | Ferguson | Mar. 17, 1942 |
| 2,540,415 | Altman | Feb. 6, 1951 |
| 2,846,157 | Stephens et al. | Aug. 5, 1958 |
| 2,860,450 | Case | Nov. 18, 1958 |